June 6, 1967 — H. R. FRAISER, JR., ET AL — 3,323,377
FIXED AXIS RATE GYROSCOPE
Filed Oct. 4, 1963 — 3 Sheets-Sheet 1

INVENTORS
Hulin R. Fraiser
Donald F. Sellers

BY J.H.C. Goldwire
AGENT

INVENTORS
Hulin R. Fraiser
Donald F. Sellers

June 6, 1967  H. R. FRAISER, JR., ET AL  3,323,377
FIXED AXIS RATE GYROSCOPE

Filed Oct. 4, 1963  3 Sheets-Sheet 3

INVENTORS
Hulin R. Fraiser
Donald F. Sellers

BY

AGENT

United States Patent Office 3,323,377
Patented June 6, 1967

3,323,377
FIXED AXIS RATE GYROSCOPE
Hulin R. Fraiser, Jr., Arlington, and Donald F. Sellers,
Dallas, Tex., assignors to Ling-Temco-Vought, Inc.,
Dallas, Tex., a corporation of Delaware
Filed Oct. 4, 1963, Ser. No. 313,847
15 Claims. (Cl. 74—5.6)

The present invention relates in general to a gyroscopic system for sensing and measuring gyrodynamic forces acting on a gyroscope rotor. More particularly, it relates to such a system wherein the rate of precession of the spin axis of the rotor about any axis perpendicular thereto can be measured for the primary application of measurement and control of the attitude and dynamics of an aircraft, missile or the like.

Gyroscopic systems are used extensively in aircraft, missiles and the like for sensing and measuring attitude changes, such as roll and pitch, and the rate of attitude change. Gyroscopic systems used for measuring the change of attitude are normally referred to as displacement gyros, whereas a rate of attitude change is measured by a rate gyro. Older systems have been characterized by the use of rotatable suspensions such as gimbals, for example, which are bulky, subject to frictional forces, and normally require an auxiliary damping system to prevent undesirable oscillatory behavior of the gyroscope.

More recently, other systems have been developed which obviate the necessity of gimbals by employing the concept of a flexible gyro rotor blade or flexible coupling of the gyro rotor to its drive shaft. Here, the spin axis of the rotor is fixed in orientation relative to the aircraft or missile frame within which it is mounted, and any precession rate of the aircraft about an axis perpendicular to the spin axis results in deflection of the flexible blade or rotor at the flexible coupling. The amount of deflection is measured to give an indication of the precession rotor.

Although these systems overcome some of the inherent disadvantages of older systems, they do not provide a system that meets all the necessary requirements of a fast-response rate gyro of inherently high accuracy and versatility. For example, the flexibly coupled, rigid rotor is very difficult to balance for high speed rotation about the spin axis in order to yield high sensitivity output and resolutions. Moreover, these systems also generate undesirable vibration frequencies of the gyro rotor when precessed about their spin axis, which results in inaccurate precession rate measurements. Another requirement which has not been adequately met by any of these systems which to date have become available is accurate measurement of precession rate about two perpendicular axes, each perpendicular to the spin axis. Finally, a suitable system for measuring precession rates without the use of frictional devices such as brushes, slip-rings and the like has not been devised.

These are but a few of the disadvantages and problems encountered in presently available rate gyro systems, and it is a broad object of this invention to provide a rate gyro system that overcomes the above enumerated disadvantages by means of a much simplified system.

The invention provides a fixed-axis, rate gyroscope that is capable of measuring, simultaneously, the rate of precession of the gyroscope about a pair of perpendicular axes, each of which is perpendicular to the spin axis of the rotor. In effect, then, the system is capable of measuring the rate of precession about any axis perpendicular to the spin axis. The gyroscope comprises a limber wheel or, as referred to hereinafter, a flexible disk mounted on a driving shaft for rotation wherein the orientation of the driving shaft is fixed in relation to a body such as an aircraft, for example, in which the precession rate is to be measured. As the body or aircraft precesses about one or more axes which are perpendicular to the driving shaft, deflections of the rotating, limber wheel occur near its periphery as a result of the gyroscopic couple or torque applied thereto. The amount of deflection of the wheel is directly proportional to the rate of precession of the body, and thus measurement of the amount of deflection is an indication of the rate of precession. Various means are used and will be described hereinafter for detecting the deflections and for relating the deflections to the rate of precession. In order to give sensitivity and rate of precession information about more than one axis as just described the means used to detect the deflections of the wheel are located along at least two radii making an angle of 90° with each other. In one embodiment, two pairs of pick-off means are used, where the two pick-off means in either pair are located on diametrically opposite radii, and the two pairs are located at an angle of 90° with each other. The pick-off means are not in contact with the limber gyro wheel and are fixed in relation to the body within which the gyroscope may be located. The limber wheel or flexible disk obviates the necessity of gimbals for mounting the gyroscope wherein a measurement of the rotation of the gimbals in relation to the body being precessed is an indication of the rate of precession. Because of the elimination of mountings, such as gimbals, the problem of mechanical wear, friction and the like in such parts is eliminated.

The flexible disk gyroscope has many advantages over other flexible bodies used as gyroscopes in that the disk is economical to manufacture and obtains true balance about its axis of rotation. Moreover, the disk may be made very thin for larger deflections per unit rate of precession. Because of its very small mass, balancing of the disk offers no difficult problems and there is much less wear on the gyroscope bearings during sustained high speed rotation.

The gyroscope of this invention is characterized by the fact that the means or pick-offs used for measuring the deflections are not in actual contact with the disk. Therefore, the only moving part in the gyroscope subject to wear is the driving axle or shaft turning on its bearings. Hence, the necessity for slip rings, brushes, commutators and the like for measuring deflections is eliminated. As will be seen in the preferred embodiment of the invention, the flexible disk geometry is readily adapted to a variable reluctance pick-off for measuring deflections where, for adequate sensitivity, narrow air gaps of close tolerances must be maintained between the pick-off means and the surface of the deflected object.

Other advantages and features will become apparent from the following detailed description of the various embodiments thereof, including a preferred embodiment, when taken in conjunction with the appended claims and the attached drawing wherein like reference number numerals refer to like parts throughout the several figures, and in which:

FIGURE 10 shows a pneumatic pick-off system used in conjunction with a flexible disk;

Figure 1:
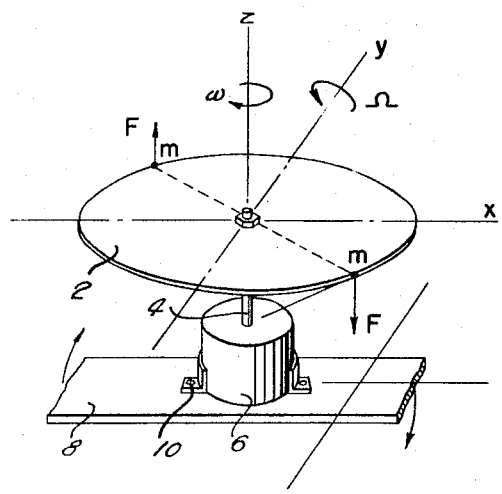
FIGURE 1 is a pictorial representation of a disk mounted for rotation on a driving shaft illustrating the basic gyroscopic principle utilized by the present invention.

In order to more clearly understand the operation of the present invention, a brief description will be given of the phenomenon of gyroscopic couples acting on a rotating body when the rotating body is precessed about an axis other than the axis of rotation. Referring now to FIGURE 1, a disk or wheel 2 is securely mounted to a shaft 4 for rotation, the latter being driven by a suitable motor 6. For purposes of the present discussion, it will be considered that the motor is securely mounted to a reference frame 8 by brackets 10. In the figure, the disk is illustrated as being driven or rotated about the z axis in the clockwise direction when looking down on the disk as indicated by the angular velocity notation ω. When the reference frame 8 and thus the disk 2 is rotated or precessed about an axis perpendicular to the z axis, such as the y axis, for example, as indicated by the counter-clockwise angular velocity Ω, a downward force F will be exerted on the side of the disk momentarily located on one side of the x axis as shown, and an equal but upward force F will be exerted on the disk momentarily situated on the diametrically opposite side of the x axis. There is no upward or downward force acting along a line on the disk which momentarily coincides with the x axis, and the maximum force will be exerted at the periphery of the wheel momentarily coinciding with the y axis. The amount of force or torque exerted on the wheel is governed by the basic gyroscope equation, namely:

(1) $$C = I\omega\Omega$$

where C is the gyroscopic couple, I is the moment of inertia of the disk about the spin axis, ω is the angular velocity of the wheel about the spin axis, and Ω is the angular or precessional velocity of the spin axis about a diametral axis in the wheel plane. The product Iω is the angular momentum of the spinning wheel. Equation 1 states that a precession of the spin axis by an external system or force will cause a torque to be exerted by the spin axis against the external system directly proportional to the angular momentum of the spinning wheel. Thus, a torque exists in response to the precession of the gyro that tends to rotate the disk about an axis (x) perpendicular to both the spin axis (z) and the precession axis (y). The vector direction of the angular velocity ω is downward along the z axis, the vector direction of the precession velocity is outward along the y axis, and the vector direction of the torque acting on the disk tending to rotate it about the x axis is to the left along the x axis. It is seen that the gyroscopic couple C, angular momentum Iω and precession velocity Ω form a mutually perpendicular vectorial system.

Figure 2:
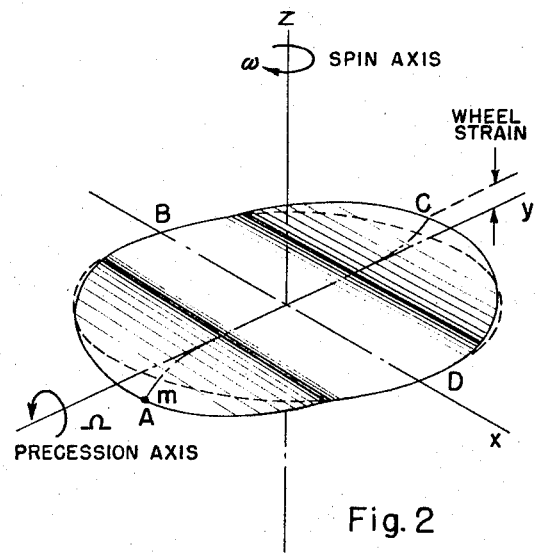
FIGURE 2 is a pictorial view of a flexible, rotating disk deflected at its periphery as a result of precession about an axis perpendicular to the spin axis of rotation.

If the disk of FIGURE 1 is flexible or limber, it will be deflected as illustrated in FIGURE 2. Again, the disk is precessed about the y axis, and the angular velocity direction is the same. The deflection, it will be noted, is the greatest at the periphery of the disk and along the y axis, whereas, there is no deflection of the disk along the x axis. As the disk rotates from point A to point B, the amount of deflection of a mass m near the periphery of the disk decreases from a maximum to zero according to a sine function. As the mass m moves from point B to point C, the deflection again follows a sine function and is deflected upward to a maximum amount at point C, which coincides with the y axis. It will be seen that the mass m executes simple harmonic motion of one complete cycle for each complete revolution of the disk.

According to the gyroscope Equation 1 above, a measurement of the deflection of the disk caused by the gyroscopic couple C is a measure of the precession rate Ω, since the gyroscopic couple C is proportional to the precessional velocity Ω. It can be shown that the deflection Z is also linearly related to the precessional velocity Ω by treating the disk as a cantilever beam of varying cross-section with a loading force F determined by the angular velocity of rotation of the disk and the precessional velocity. It turns out that the deflection Z of the disk at the periphery is:

(2) $$Z = F(\sigma)\frac{\omega\Omega\rho a^5}{Eh^2}$$

where ρ is the density of the disk in pounds/in.³, a is the disk radius in inches, E is Young's Modulus of the disk material, h is the disk thickness in inches, and F (σ) is a function of the ratio of hub diameter to disk diameter if the disk is clamped at the center with a hub. For any given disk, the quantities F (σ), ρ, a, E and h are constant, and when the disk is rotated at a constant angular velocity ω, the deflection Z is a linear function of and is directly proportional to the precessional velocity Ω. It will be noted that the diametrically upward and downward deflections of the disk are equal in magnitude, where a measurement of either or a measurement of diametrical opposite deflections is proportional to the precession rate, the latter yielding twice the indication as the former.

Figure 3:
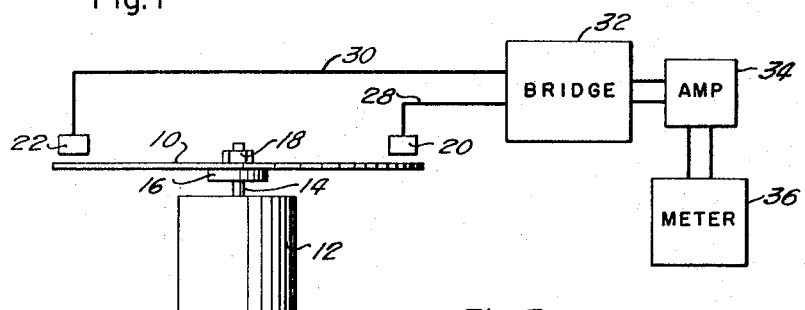
FIGURE 3 is a schematic illustration of the invention.

A simplified schematic illustration of the gyroscope of the invention is shown in FIGURE 3, where a disk 10 is mounted by suitable clamps 16 and 18 on a driving shaft 14, the latter being driven by a motor 12 or any other suitable means. A pair of diametrically opposite pick-off means 20 and 22, to be described in detail hereinafter, are positioned near the periphery of the wheel to measure the deflection thereof, and this information is fed through connections 28 and 30 to a bridge 32 for numerically adding the deflections. An electrical output of the bridge, proportional to the precession rate is amplified by amplifier 34 and fed to a meter 36 or other indicating means, as shown. Similarly, other pick-off means can be located beneath the disk and can be used in conjunction with pick-offs 20 and 22. Although only a single pair of diametrically opposite pick-offs are shown, it is to be understood, as will be shown and described hereinafter, that a second pair of diametrically opposite pick-offs oriented at 90° to the pair shown can be used to obtain information as to precession rate about two perpendicular axes.

Figure 4:
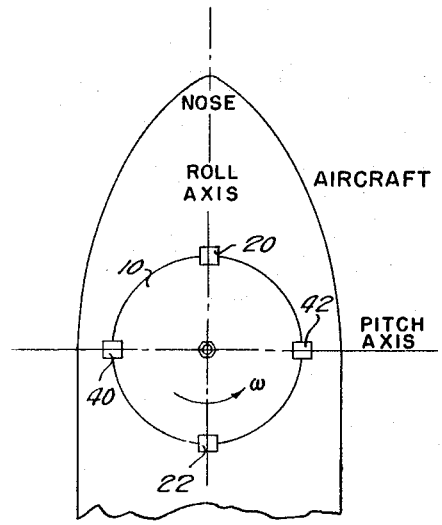
FIGURE 4 illustrates the mounting orientation of the gyroscope within an aircraft, missile or the like for measuring the rate of precession about the roll and pitch axes of the aircraft.

A plan view of an aircraft and the mounting orientation of the gyroscope for the roll and pitch detection of the aircraft is shown in FIGURE 4, where the disk 10 is mounted on a driving shaft perpendicular to the plane of the drawing. The roll and pitch axes, located in the plane of the drawing, form a mutually perpendicular coordinate system with the spin axis of rotation of the disk. A first pair of pick-off means 20 and 22 are mounted in closely spaced relation to the disk diametrically opposite to each other along the roll axis. A second pair of pick-offs 40 and 42 are similarly mounted close to the disk diametrically opposite to each other along the pitch axis, the two pairs of pick-off means being at 90° to each other. The wheel is shown to be rotating in a counter-clockwise direction at an angular velocity ω. When the nose of the aircraft is forced downward into the plane of the drawing, the portion of the disk beneath the pick-off 42 will be deflected upward, and the portion of the disk beneath the pick-off 40 will be deflected downward. No deflection of the disk will occur in line with the roll axis. Similar deflections of the flexible disk beneath the pick-offs 20 and 22 will occur if the aircraft is forced to rotate about the roll axis. Should the aircraft precess about an axis between the roll and pitch axes in the plane of the same, maximum deflections of the disk will occur in line with the precession axis, and thus, some deflection will occur beneath each of the pick-offs 20, 22, 40 and 42. By proper relationship of the information obtained from these pick-offs, the precession rate and direction of precession can be obtained, as will be described below.

Figure 5:
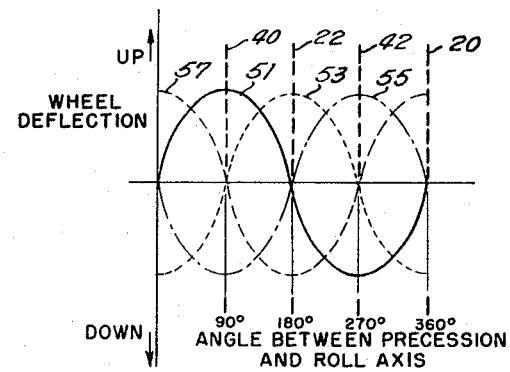
FIGURE 5 is a graphical illustration of the wheel deflection as a function of the degree of rotation of the wheel.

A graphical illustration of the disk deflection versus the degree rotation from an arbitrary reference for the four pick-offs of FIGURE 4 is shown in FIGURE 5. The ordinate of the graph represents the deflection of a mass near the periphery of the disk as it rotates about one complete revolution. The abscissa represents the angle in which the mass has rotated. The curve 55 is representative of the disk deflection through one complete cycle for the angular velocity direction noted in FIGURE 4 when the nose of the aircraft is forced downward. It will be seen that a mass on the disk executes simple harmonic motion each cycle of revolution of the disk. The other curves 51, 53 and 57 illustrate the disk deflection for other precession directions and axes. The numerals 20, 22, 40 and 42 denote the deflections in relation to the pick-offs.

As just described, the invention has primary application to a system for measuring the rate of precession about two perpendicular axes, each of which is perpendicular to the spin axis of rotation of the gyroscopic disk, and this measurement is accomplished by means of the flexible disk concept. It will be observed that if the gyroscope is free to move in relation to the aircraft, the disk would not deflect, but rather the whole gyroscope would precess as a result of any tendency for it to be rotated through a torque or couple applied to the axis of rotation. However, the gyroscope of this invention is fixed in relation to the aircraft frame; namely, the spin axis of rotation of the disk is fixed. As the aircraft rotates about any axis other than the axis of rotation, the disk will deflect. Thus, the gyroscopic system of this invention can aptly be termed a fixed-axis, rate gyro, since the axis of rotation is fixed and the system determined the rate of precession of the aircraft.

Figure 6:
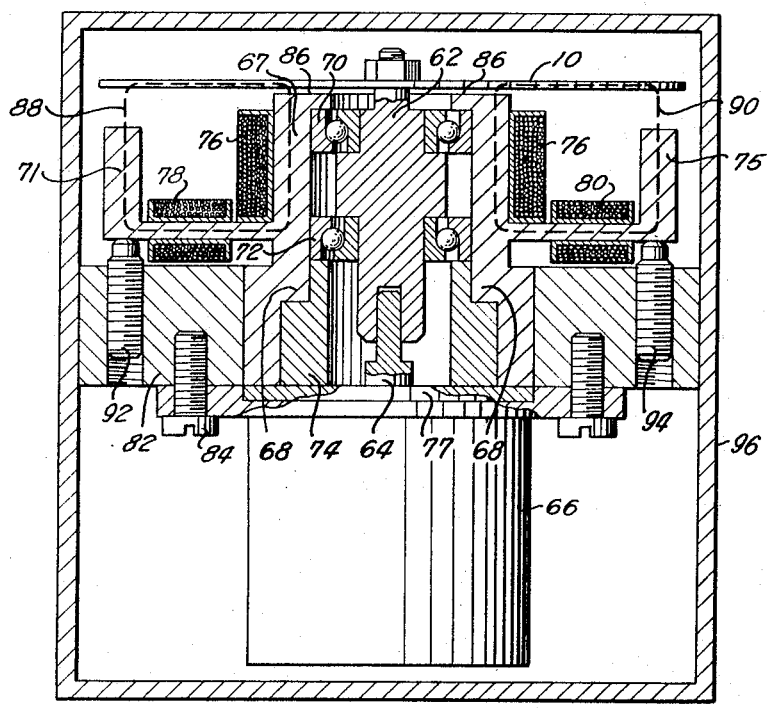
FIGURE 6 is a view, partly in section, of a preferred embodiment of the invention utilizing a variable reluctance pick-off for measuring deflections of the flexible disk.
Figure 7:
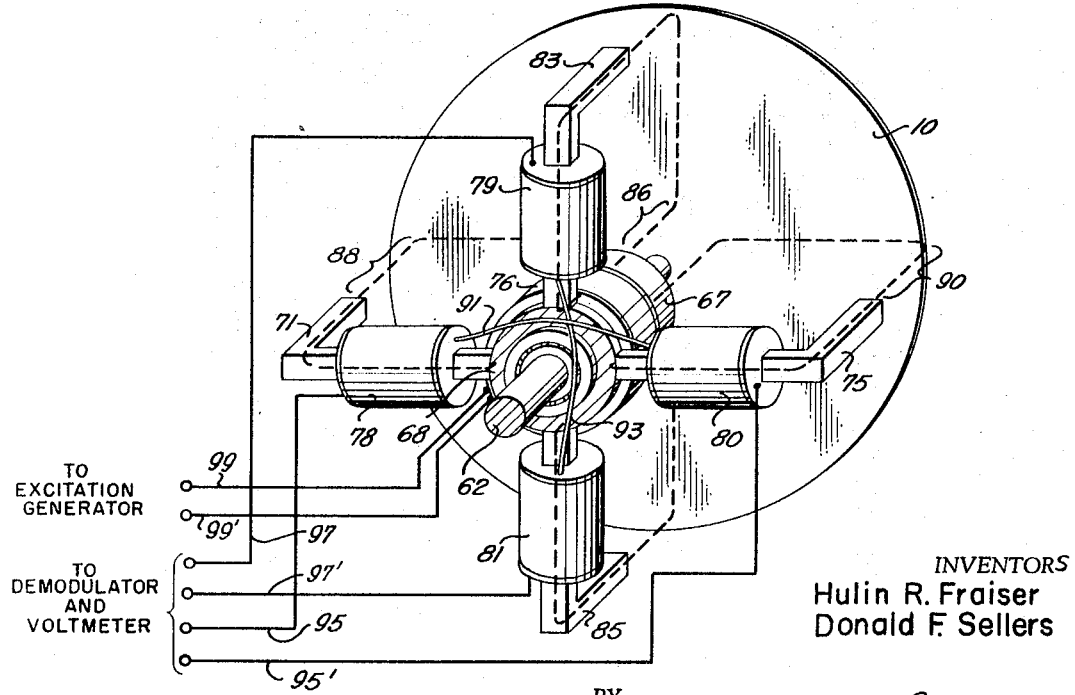
FIGURE 7 is an enlarged pictorial view of the flexible disk and variable reluctance pick-off means shown in FIGURE 6.

A view, partly in section, of a preferred embodiment of the invention using a variable reluctance pick-off means is shown in FIGURE 6, and an enlarged pictorial view of the flexible disk and the pick-off means is shown in FIGURE 7. The system comprises a flexible or limber disk 10 securely mounted to a rotable shaft 62, which shaft is engaged by the armature 64 of a motor 66. The shaft rides on bearings 70 and 72 which are mounted between the shaft and a magnetic yoke 68 and held in place by a generally cylindrical bearing retainer 74. The magnetic yoke 68 is generally cylindrical at the center section 67, surrounding the shaft and bearings, and includes four arms at 90° angles, only two of which are shown. Diametrically opposite arms 71 and 75 extend radically outwardly from the yoke and have upturned projections extending toward the periphery of the disk. The central portion 67 of the magnetic yoke forms a circular air gap 86 with the central portion of the disk, and the arms of the yoke form air gaps 88 and 90 with the peripheral portions of the disk, the other arms of the yoke not shown forming similar air gaps with the disk. The central air gap 86 is preferably narrower than the air gaps between the arms and the disk. The former is narrow to provide a maximum magnetic flux through the disk, and the latter are wider to permit freedom for disk flexure. A housing 96 encloses the system, and a retaining wall 82 secured in place by a set screw (not shown) through the housing maintains the component parts of the gyroscope in place. The motor 66 is bolted to the retaining wall with bolts 84, and a plate 77 maintains the bearing retainer in place. The magnetic yoke is fixed to the retaining wall by any suitable means. Adjustment screws 92 and 94 are provided for adjusting the air gaps 88 and 90. A primary winding 76 is provided about the central portion of the yoke 67 and is actuated by an alternating voltage source (not shown) to produce a symmetrical flux distribution through the central portion of the yoke, the disk and the four arms of the yoke, as shown by the dashed lines. Secondary windings are provided about the four arms as indicated by the winding 78 about arm 71 and the winding 80 about arm 75. As the air gaps 88 and 90, for example, are altered due to deflection of the disk, the amount of magnetic flux flowing through the air gap is similarly altered and the voltage induced in the secondary winding is varied accordingly. Diametrically opposite secondary windings are connected together in opposite polarity (shown in FIGURE 7) to give an additive effect, since when one portion of the disk is deflected downward, the diametrically opposite portion of the disk is deflected upward. This configuration eliminates the effects on the output signal of "g"-loads in a direction parallel to the axis of rotation. "G"-loads in such direction deflect all edge portions of the disk to impart to the latter a dished shape. As a result, the gap between the disk and each pick-off varies with the "g"-load imposed but in a like manner at each pick-off so that the net effect on the output signal is zero.

The system shown in FIGURE 6 is securely attached via the housing 96 to the frame of an aircraft, for example, so that the spin axis of rotation of the disk is fixed in relation to the frame. As the aircraft is rotated through roll, pitch or the like, the axis of rotation is subjected to the same motion as the aircraft, which motion of precession produces deflections of the flexible disk.

Figure 8:
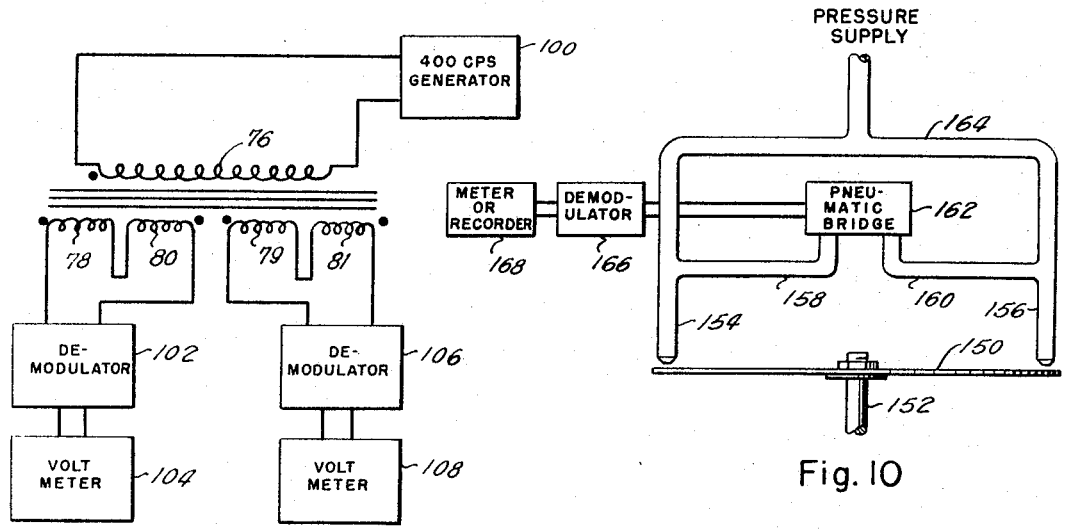
FIGURE 8 is an electrical schematic of the variable reluctance pick-off shown in FIGURES 6 and 7.

An enlarged view of the magnetic yoke and flexible gyro disk is shown in FIGURE 7. The magnetic yoke with the primary and secondary windings, when used in conjunction with the flexible gyro disk, constitute a variable reluctance pick-up for measuring the deflections at the periphery of the disk. As shown in FIGURE 7, the central portion 67 of the magnetic yoke comprises a hollow, cylindrical portion with one end thereof forming an air gap 86 with the central portion of the disk 10. The magnetic yoke includes four arms 71, 75, 83 and 85, the ends of which form air gaps with the peripheral portion of the disk, such as, for example, the air gap 88 between arm 71 and the disk, and the air gap 90 between arm 75 and the disk. It will also be noted that the four arms are positioned at four quadrants of the disk such that deflections in two axes can be determined. The central portion of the yoke has wound thereabout a primary coil 76, having electrical connections 99 and 99' to which are connected an excitation generator, such as an alternating current generator 100 as shown in FIGURE 8, to produce a symmetrical magnetic flux through the central portion of the yoke, through the disk and through each of the four arms as indicated by the dashed lines. Thus, there are four magnetic paths, each of which includes a complete magnetic circuit comprised of the central portion of the yoke, the disk and an arm, and the two air gaps. Secondary windings are provided about each of the arms to sense any magnetic flux change through the arms due to variation of the air gaps between the arms and the disk. Secondary winding 78 provided about arm 71 is connected in series but opposite in polarity to secondary winding 80 provided about arm 75. Similarly, secondary winding 79 wound about arm 83 is connected in series but opposite in polarity with secondary winding 81 wound about arm 85. Electrical connections 95 and 95' from secondary windings 78 and 80, respectively, are connected to a demodulator 102 and voltmeter 104, as shown in FIGURE 8. Similarly, connections 97 and 97' from secondary windings 79 and 81, respectively, are connected to another demodulator 106 and voltmeter 108.

When primary winding 76 about the central portion 67 of the magnetic yoke is excited by an alternating current to produce an alternating magnetic flux through the disk and the arms, the voltages induced in the secondary windings of opposite arms cancel each other because of the opposite polarities of the two windings. However, if the air gap 88, for example, is narrowed due to deflection of the disk toward the arm 71, the air gap 90 will be increased by an equal amount as a result of deflection of the disk away from the arm 75. More magnetic flux will then flow through arm 71 and, similarly, less magnetic flux would flow through arm 75. An increase in induced voltage would be detected through coil 78, whereas a decrease in induced voltage would be detected through coil 80, the magnitudes of the two changes being added because of opposite polarities of the secondary windings. This difference voltage is an indication of the deflection of the wheel and thus the rate of precession about a particular axis.

A schematic circuit of the electrical connections of the primary and secondary windings is shown in FIGURE 8. It will be seen that an alternating voltage is required in the primary 76 to induce a voltage in the secondary windings. The primary winding is shown connected to an alternating current generator 100 at a frequency of, for example, 400 c.p.s. The secondary windings 78 and 80 are shown connected together in series with opposite polarities, and with the outputs thereof connected to a demodulator 102 and voltmeter 104. Similar connections are made for secondary windings 79 and 81 to demodulator 106 and voltmeter 108. As the wheel is precessed about a particular axis, the magnitude of the induced secondary voltage will increase or decrease as the rate of precession changes, and the induced alternating secondary voltage will be amplitude modulated accordingly. The demodulator is provided to provide an output voltage according to the envelope of the amplitude modulated excitation frequency.

The yoke and disk are made of a good magnetic material to provide a magnetic path of low magnetic reluctance. For example, an alloy of 50% iron and 50% nickel is suitable for this purpose. As an example of the dimensions and sensitivity of the system shown in FIGURE 6, a disk machined from the above alloy was ground to a thickness of .007 inch, with a diameter of 2.125 inches. When the disk is rotated at a speed of 24,000 r.p.m., the deflection at the periphery is .0093 inch per radian per second angular precessional velocity about an axis perpendicular to the spin axis of rotation. The deflection can be calculated from the preceding Equation 2. For a 400 c.p.s. excitation voltage in the variable reluctance pick-off with 3000 turns on the primary winding and 4500 turns on each secondary winding, based on a primary winding current of 20 milliamps, a maximum linear flux density of 8000 gauss using the 50% nickel-50% iron core and disk, and a primary air gap length of .005 inch in which the area is .01 square inch, the gyro pick-off sensitivity is 107 volts per inch. The gyro sensitivity is the product of the pick-off sensitivity, and the disk sensitivity (.0093 inch/radian), and is equal to 1 volt per radian per second.

It is important to consider the various possible bending modes of the flexible disk and the several possible vibrational frequencies that may be present. The first bending mode with a single nodal diameter is the most important to consider, since this is the mode to which the gyroscopic forces will force the wheel. It can be shown that the frequency of the natural vibration in this mode is greater than the spin frequency of the disk, such that the disk deflections will be as described in the preceding Equation 2. Moreover, it can also be shown that the disk can be rotated at very high speeds before approaching the yield point or maximum stress capability of the disk. This is an important factor assuring long fatigue life of the gyro disk. At least one other factor of importance is the cross-coupling between pick-offs oriented at 90° to each other for the simultaneous measurement of precession rates about two perpendicular axes. It can be shown that very little, if any, cross-coupling is present in the gyro disk, and thus the accuracy of such a measurement is not impaired.

Figure 9:
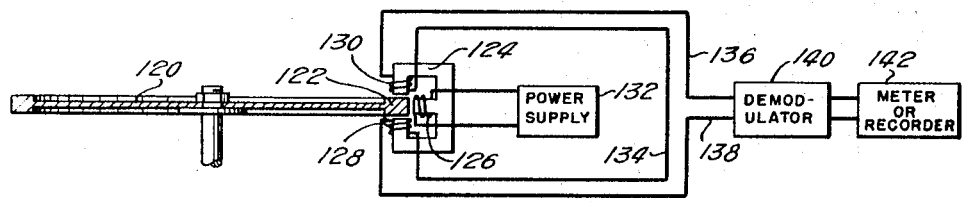
FIGURE 9 shows an electrical E-core transducer used as a pick-off in conjunction with a flexible disk.

Another embodiment of a variable reluctance pick-up is shown in FIGURE 9, wherein an "E" core transducer is used to detect the degree of deflection of the disk. An "E" core transducer 124 is positioned at the periphery of the disk 120 with upper and lower arms opposing each other in closely spaced relation to opposite surfaces of the disk. A central arm of the transducer opposes the edge of the disk as shown. The thickness of the disk at its periphery is preferably greater than its internal thickness as shown at 122 to approximately match the transducer dimensions and narrow the air gaps. The operation of the transducer is essentially the same as that described with reference to FIGURE 8, where a primary winding 126 is provided about the central arm and is connected to an excitation generator 132, and secondary windings 128 and 130 are wound about the respective opposing arms of the transducer. The secondary windings are serially connected with opposite polarities as previously described. As the disk deflects, the magnetic flux is increased or decreased in the respective opposing arms and added as described with reference to FIGURE 8, and the amplitude modulated signal is fed into a demodulator 140 and read on a meter 142. Although only a single transducer is shown, it is to be understood that another transducer can be provided at 90° to that shown to provide information.

A pneumatic pick-off system is shown in FIGURE 10, where a flexible disk 150 is driven on a shaft 152 from a motor or the like, and jet pipes 154 and 156 are directed against the peripheral portions of the disk. The jet pipes are commonly connected through pipe 164 to a suitable pressure supply (not shown), and a small air gap is maintained between the orifice in each of the jet pipes and the disk. As the disk deflects as a result of precession about an axis perpendicular to the axis of rotation and the air gap between the disk and jet pipe 154 is increased, for example, the air gap between the jet pipe 156 and the disk will be decreased. This results in a pressure decrease in the jet pipe 154 and a corresponding pressure increase in the jet pipe 156. Connected to jet pipes 102 and 104 are pipe connections 158 and 160, respectively, through which the pressure in the jet pipes are transmitted. A pneumatic bridge 162 of conventional design, for example, measures the differential pressure between the connections 158 and 160, the differential in pressure being a measure of the precession rate of the wheel. The differential pressure is converted to an electrical signal which is fed to a demodulator 166 and read on a meter or recorder 168. It should be understood that although there has been shown a pick-off means in only a single axis, similar pick-off means can be used at 90° to the pick-off shown for providing information about two perpendicular axes.

Figure 11:
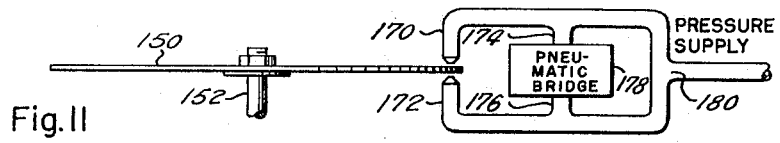
FIGURE 11 is another illustration of a pneumatic pick-off system.

A pneumatic pick-off system similar to that described in FIGURE 10 is shown in FIGURE 11 where the jet nozzles 170 and 172 oppose each other on opposite surfaces of the disk 150. As the disk deflects upward or downward, as the case may be, a differential pressure is read through the extension pipes 174 and 176 by the pneumatic bridge 178. Pressure is supplied to the jet pipes through the connection 180 from a pressure supply. Information as to the precession rate is derived from the pneumatic bridge as described above. Again, an additional pick-off at 90° to that shown will provide information about two perpendicular axes.

Figure 12:
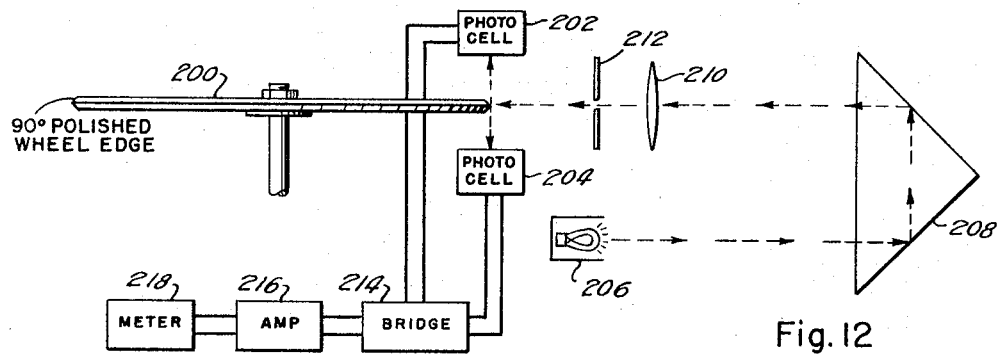
FIGURE 12 shows an optical pick-off system used with a flexible disk.

An optical pick-off system is shown in FIGURE 12 where a flexible gyro disk 200 has a 90° polished edge as shown. Light from a light source 206 is directed on the edge of the disk through lens 210 and collimator 212, and when the disk is rotating without deflection, the light strikes the 90° angle of the disk and reflects equally into photocells 202 and 204. The sensitivity of the photocells can be adjusted to give equal output readings when the disk is not deflected. A 90° prism 208 can be used to fold the light path and lengthen the same. As the disk deflects, more light will be reflected into one photocell than in the other, and thus the output voltages will be different. The voltage differential is measured in a bridge 214, which differential is a measure of the precession rate of the wheel. The output of the bridge is amplified through amplifier 216 and fed to a meter 218 to indicate the precession rate.

All of the foregoing embodiments of the invention, including the preferred embodiment using a variable reluctance pick-up for measuring the disk deflection, are capable of providing accurate and instantaneous information about precession rates of the system about two perpendicular axes. The invention is characterized by simplicity of design with a minimum of frictioned wear, as evidenced by the fact that the pick-offs used to measure the disk deflection are nowhere in contact with the disk and do not require slip-rings, brushes or the like. Moreover, the flexible disk can be economically manufactured to a true balance, which, in turn, assures a long life and consistent accuracy as a rate gyro. Modifications will undoubtedly become apparent to those skilled in the art, including further advantages and features, and it is intended that all such modifications and substitutions that come within the scope of the appended claims are a part of the present invention.

What is claimed is:

1. Apparatus utilizing gyrodynamic forces for sensing and measuring the rate of rotation of said apparatus when rotated by an external force applied thereto, comprising:
    (a) a flexible disk,
    (b) means for continuously rotating said disk about an axis of rotation through its center perpendicular to the plane of said disk,
    (c) said disk undergoing bending and deflection out of said plane in response to gyrodynamic reactions when said disk is precessed about an axis perpendicular to said axis of rotation, and
    (d) means fixed in relation to a plane perpendicular to said axis of rotation and spaced from and mechanically independent of said disk for measuring the amount of deflection of said disk at a point along a radial line from said axis of rotation.

2. Apparatus according to claim 1 wherein said means for measuring the amount of said deflection comprises means for directing a fluid under pressure against the surface of said disk at said point, and means for measuring a change in said pressure of said fluid caused by deflection of said disk at said point.

3. Apparatus utilizing gyrodynamic forces for sensing and measuring the rate of rotation of said apparatus when rotated by an external force applied thereto, comprising:
    (a) a flexible disk,
    (b) means for continuously rotating said disk about an axis of rotation through its center perpendicular to the plane of said disk,
    (c) said disk undergoing bending and deflection out of said plane in response to gyrodynamic reactions when said disk is precessed about an axis perpendicular to said axis of rotation,
    (d) a first detector fixed in relation to a plane perpendicular to said axis of rotation and spaced from and mechanically independent of said disk for measuring the amount of deflection of said disk at a point along a first radial line from said axis of rotation, and
    (e) a second detector fixed in relation to said plane perpendicular to said axis of rotation and spaced from and mechanically independent of said disk for measuring the amount of deflection of said disk at a point along a second radial line from said axis of rotation, said second radial line being perpendicular to said first radial line.

4. Apparatus according to claim 3 wherein said first and said second detectors comprise means for directing a fluid under pressure against the surface of said disk at said first and said second points, and means for measuring a change in said pressure of said fluid caused by deflection of said disk at either of said first and said second points.

5. Apparatus utilizing gyrodynamic forces for sensing and measuring the rate of rotation of said apparatus when rotated by an external force applied thereto, comprising:
    (a) a flexible disk,
    (b) means for continuously rotating said disk about an axis of rotation through its center perpendicular to the plane of said disk,
    (c) said disk undergoing bending and deflection out of said plane in response to gyrodynamic reactions when said disk is precessed about an axis perpendicular to said axis of rotation, and
    (d) a pair of detectors fixed in relation to a plane perpendicular to said axis of rotation and spaced from and mechanically independent of said disk for measuring the amounts of deflections of said disk at first and second points, respectively, located along diametrically opposite radial lines from said axis of rotation.

6. Apparatus according to claim 5 including third and fourth detectors fixed in relation to said plane perpendicular to said axis of rotation and spaced from and mechanically independent of said disk for measuring the amounts of deflections of said disk at third and fourth points, respectively, located on diametrically opposite radial lines from said axis of rotation, said third and fourth points being located along radial lines perpendicular to said radial lines along which said first and said second points are located.

7. Apparatus utilizing gyrodynamic forces for sensing and measuring the rate of rotation of said apparatus when rotated by an external force applied thereto, comprising:
    (a) a flexible disk, comprised of a magnetically permeable material,
    (b) means for continuously rotating said disk about an axis of rotation through its center perpendicular to the plane of said disk,
    (c) said disk undergoing bending and deflection out of said plane in response to gyrodynamic reactions when said disk is precessed about an axis perpendicular to said axis of rotation, and
    (d) variable reluctance means for measuring the amount of deflection of said disk from said plane at a point along a radial line from said axis of rotation, said variable reluctance means comprising:
        (1) a magnetically permeable core forming a first air gap with a central portion of said disk and a second air gap with a portion of said disk spaced from said central portion,
        (2) said core, said first and said second air gaps and said disk forming a magnetic circuit when a magnetic flux is created therein,
        (3) means for creating a magnetic flux within said magnetic circuit, and
        (4) means for measuring a change in said magnetic flux caused by a change in the length of said second air gap when said disk deflects from said plane.

8. Apparatus according to claim 7 wherein said means for creating said magnetic flux includes a first winding wound about said core for creating said flux when a current is passed therethrough, and said means for measuring said change in said magnetic flux includes a second winding wound about said core.

9. Apparatus utilizing gyrodynamic forces for sensing and measuring the rate of rotation of said apparatus when rotated by an external force applied thereto, comprising:
- (a) a flexible disk comprised of a magnetically permeable material,
- (b) means for continuously rotating said disk about an axis of rotation through its center perpendicular to the plane of said disk,
- (c) said disk undergoing bending and deflection out of said plane in response to gyrodynamic reactions when said disk is precessed about an axis perpendicular to said axis of rotation, and
- (d) variable reluctance means fixed in relation to a plane perpendicular to said axis of rotation for measuring the amounts of deflections of said disk at first and second points located along diametrically opposite radial lines from said axis of rotation, said variable reluctance means comprising:
    - (1) magnetically permeable core having a central portion aligned on said axis of rotation and a pair of oppositely extending arms,
    - (2) said central portion of said core forming an air gap with the central portion of said disk and said arms forming air gaps with portions of said disk spaced from said central portion at said first and said second points, respectively,
    - (3) said central portion of said core and one of said arms forming a first magnetic circuit with said disk in series with said air gaps associated therewith when a magnetic flux is created therein, and said central portion of said core and the other of said arms forming a second magnetic circuit with said disk in series with said air gaps associated therewith when a magnetic flux is created therein,
    - (4) means for creating a magnetic flux within each of said first and said second magnetic circuits, and
    - (5) means for measuring a change in said magnetic flux in each of said circuits caused by changes in the lengths of said air gaps between said arms and said disk when said disk deflects from a plane perpendicular to said axis of rotation.

10. Apparatus according to claim 9 wherein said means for creating said magnetic flux includes a primary winding wound about said central portion of said core, and said means for measuring said change in magnetic flux in each of said circuits includes a first secondary winding wound about one of said pair of arms and a second secondary winding wound about the other of said pair of arms.

11. Apparatus according to claim 10 wherein said first and said second secondary windings are connected in electrical series with opposite polarities.

12. Apparatus utilizing gyrodynamic forces for sensing and measuring the rate of rotation of said apparatus when rotated by an external force applied thereto, comprising:
- (a) a flexible disk comprised of a magnetically permeable material,
- (b) means for continuously rotating said disk about an axis of rotation through its center perpendicular to the plane of said disk,
- (c) said disk undergoing bending and deflection out of said plane in response to gyrodynamic reactions when said disk is precessed about an axis perpendicular to said axis of rotation, and
- (d) variable reluctance means fixed in relation to a plane perpendicular to said axis of rotation for measuring the amounts of deflections of said disk at first and second points located along diametrically opposite first and second radial lines from said axis of rotation and at third and fourth points located along diametrically opposite third and fourth radial lines perpendicular to said first and second radial lines, said variable reluctance means comprising:
    - (1) a magnetically permeable core having a central portion aligned on said axis of rotation, a first pair of oppositely extending arms and a second pair of oppositely extending arms at 90° to said first pair of arms,
    - (2) said central portion of said core forming an air gap with the central portion of said disk, said first pair of arms forming air gaps with portions of said disk spaced from said central portion at said first and said second points, respectively, and said second pair of arms forming air gaps with portions of said disk spaced from said central portion at said third and said fourth points, respectively,
    - (3) each of said arms of said first and said second pair of arms forming a magnetic circuit with the central portion of said core, said disk and the air gaps associated therewith when a magnetic flux is created therein,
    - (4) means for creating a magnetic flux within each of said magnetic circuits, and
    - (5) means for measuring a change in said magnetic flux in each of said circuits caused by changes in the lengths of the air gaps between said arms and said disk when said disk deflects from a plane perpendicular to said axis of rotation.

13. Apparatus according to claim 12 wherein said means for creating said flux includes a primary winding wound about said central portion of said core, and said means for measuring said change in magnetic flux in each of said circuits includes a separate secondary winding wound about each of said arms of said first and said second pair of arms.

14. Apparatus according to claim 13 wherein said separate secondary windings wound about each of said arms of said first pair of arms are connected in electrical series with opposite polarities, and said separate secondary windings wound about each of said arms of said second pair of arms are connected in electrical series with opposite polarities.

15. Apparatus utilizing gyrodynamic forces for sensing and measuring the rate of rotation of said apparatus when rotated by an external force applied thereto, comprising:
- (a) a flexible disk the edge of which is adapted for reflecting light, when incident thereon, along a first and a second path,
- (b) means for continuously rotating said disk about an axis of rotation through its center perpendicular to the plane of said disk,
- (c) said disk undergoing bending and deflection out of said plane in response to gyrodynamic reactions when said disk is precessed about an axis perpendicular to said axis of rotation,
- (d) means for directing a beam of light on a portion of said edge of said disk along a path fixed in relation to a plane perpendicular to said axis of rotation, and
- (e) means for measuring the quantity of light reflected along each of said first and said second paths.

References Cited
UNITED STATES PATENTS

| | | | |
|---|---|---|---|
| 2,951,376 | 9/1960 | Lahde | 74—5.6 |
| 3,147,627 | 9/1964 | Hunn | 74—5.6 |

FRED C. MATTERN, Jr., *Primary Examiner.*

PALMER W. SULLIVAN, *Examiner.*

J. D. PUFFER, *Assistant Examiner.*